(No Model.) 4 Sheets—Sheet 1.
E. FISCHER.
AUTOMATIC CUT-OFF SAWING MACHINE.
No. 483,998. Patented Oct. 11, 1892.
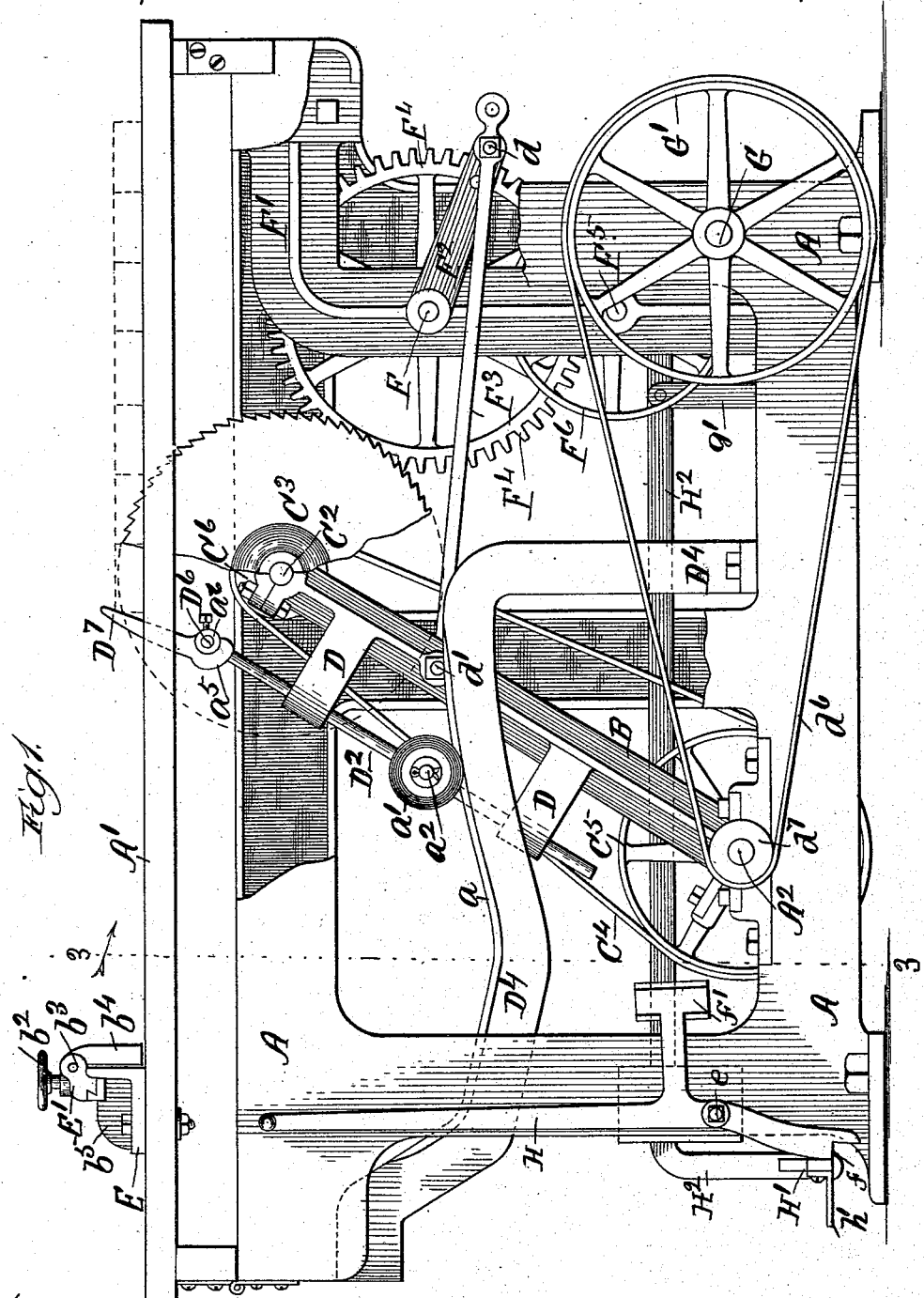
Witnesses:
Chas E Gaylord
Clifford H White
Inventor:
E. Fischer.
By L. B. Coupland & Co
Attys

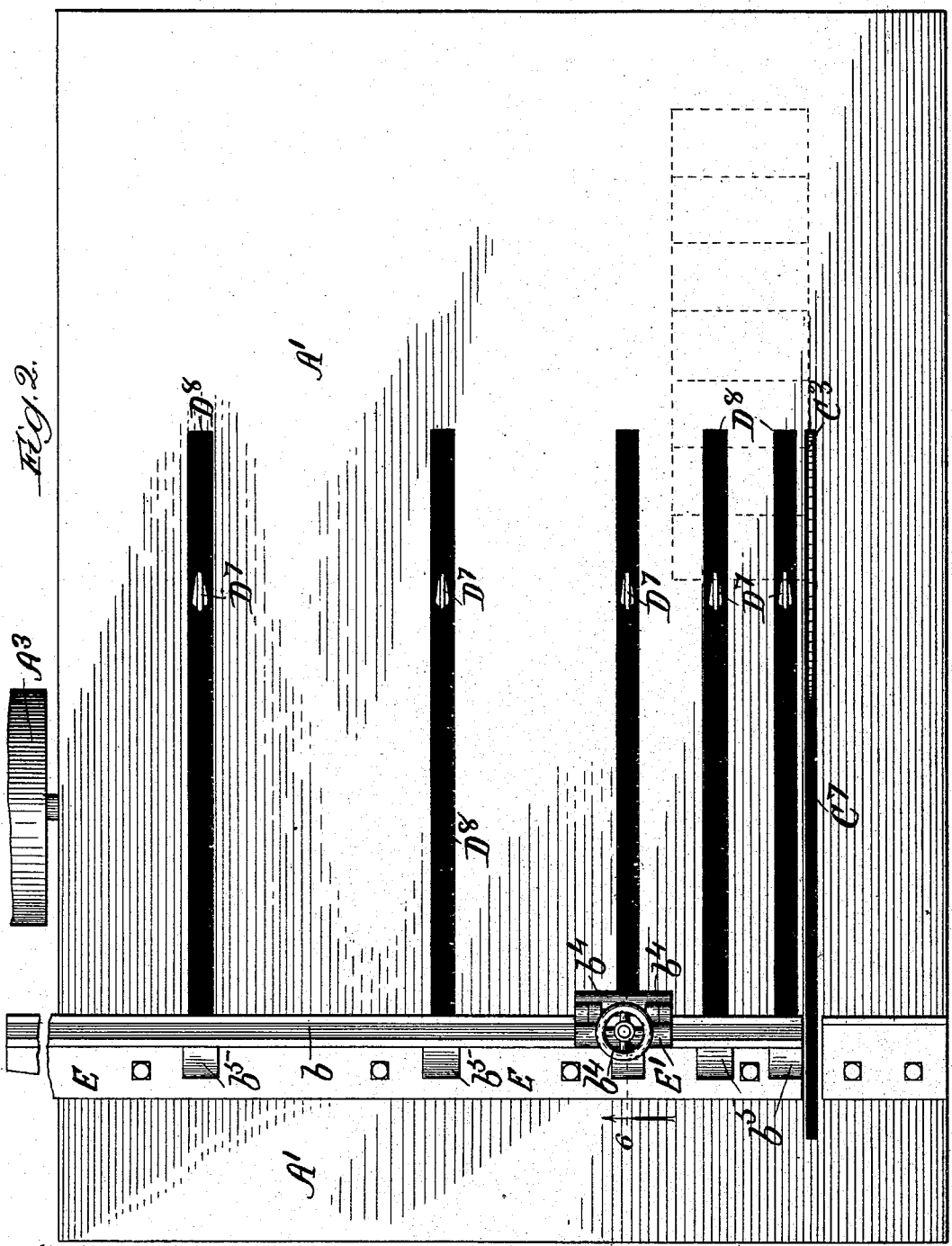

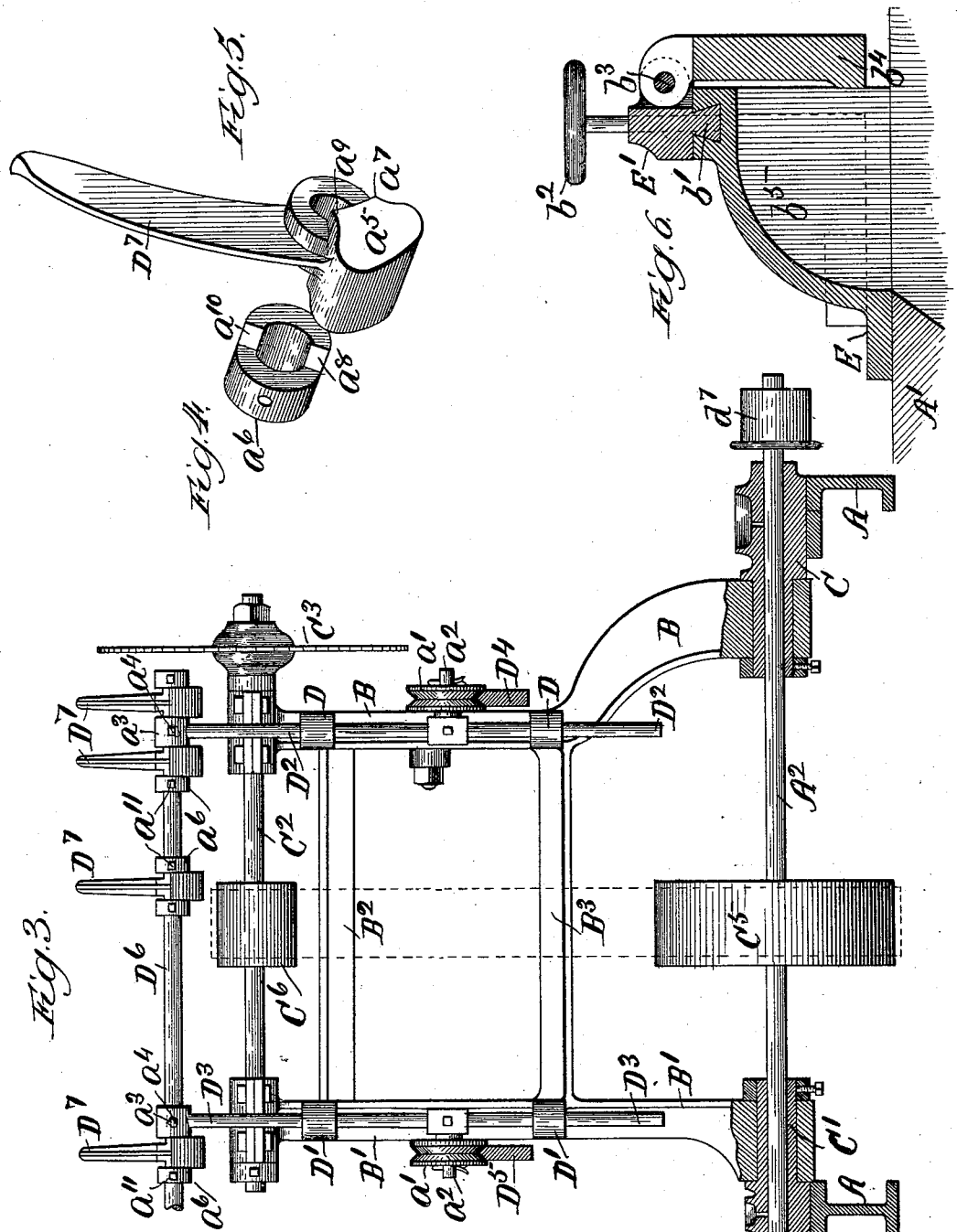

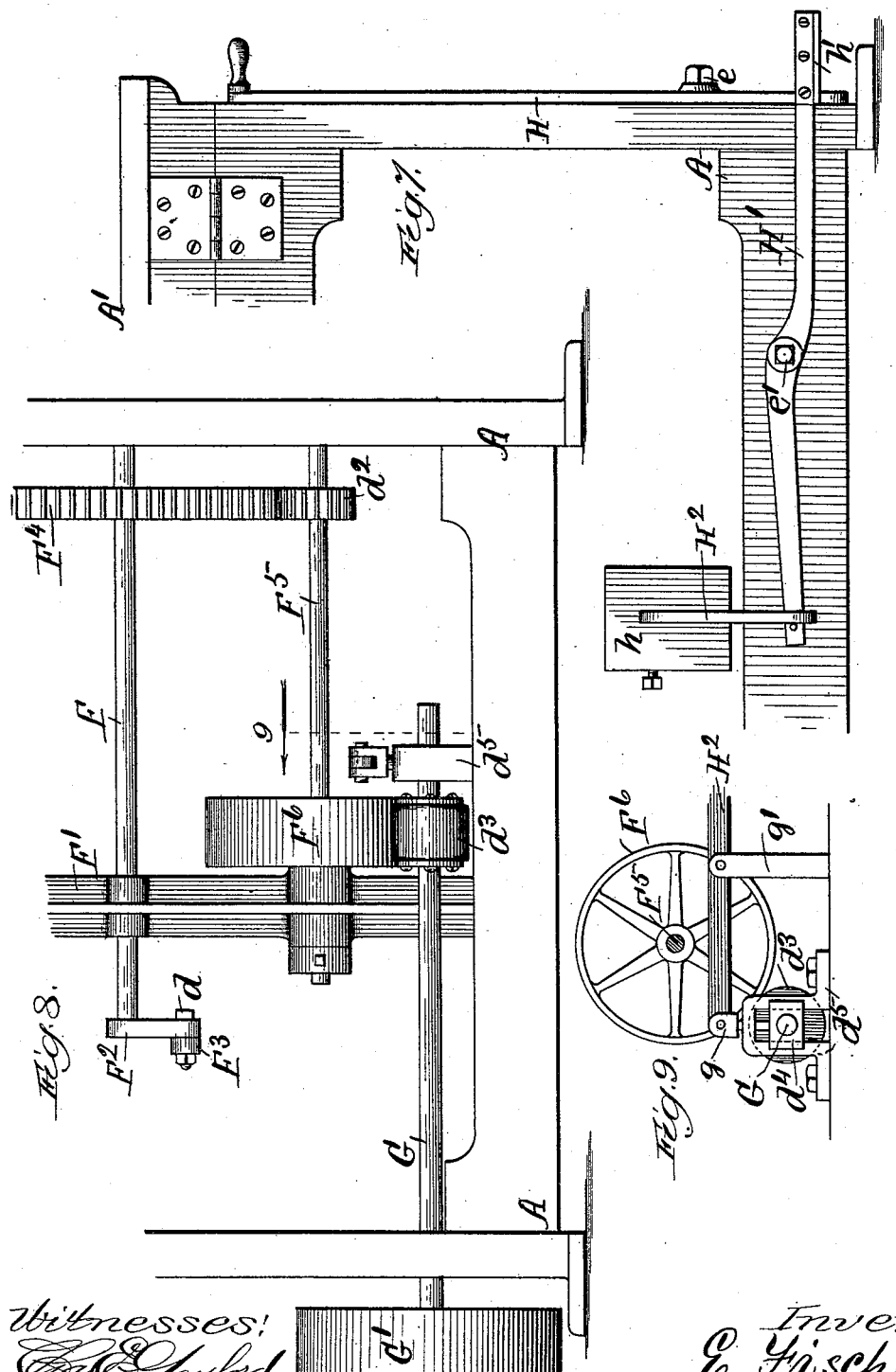

UNITED STATES PATENT OFFICE.

ENGELBERT FISCHER, OF CHICAGO, ILLINOIS.

AUTOMATIC CUT-OFF SAWING-MACHINE.

SPECIFICATION forming part of Letters Patent No. 483,998, dated October 11, 1892.

Application filed March 7, 1891. Serial No. 384,102. (No model.)

*To all whom it may concern:*

Be it known that I, ENGELBERT FISCHER, a citizen of the United States, residing at Chicago, in the county of Cook and State of Illinois, have invented certain new and useful Improvements in Automatic Cut-Off Sawing-Machines, of which the following is a full, clear, and exact description, that will enable others to make and use the same, reference being had to the accompanying drawings, forming a part of this specification.

This invention relates to improvements in that class of machines used for cutting up lumber into any required lengths, and more especially light boards or stuff in box-manufactories; and the same consists of certain novel features in the construction, arrangement, and operation, whereby the work is greatly facilitated, as will be hereinafter set forth.

In the drawings, Figure 1 is a side elevation of a machine embodying my improved features; Fig. 2, a plan; Fig. 3, a vertical transverse section on line 3' 3', Fig. 1, looking in the direction indicated by the arrow, the upper part of the main frame and feed-table being omitted; Figs. 4 and 5, detached details; Fig. 6, an enlarged broken-away vertical section on line 6, Fig. 2, looking in the direction indicated by the arrow; Fig. 7, a broken-away elevation of the front end; Fig. 8, a broken-away rear elevation; and Fig. 9, a vertical section on line 9, Fig. 8.

Referring to the drawings, A represents the different parts of the main frame; A', the feed-table; $A^2$, the main driving-shaft; $A^3$, the band-pulley mounted on the end of the driving-shaft at the left side of the machine.

The swinging or oscillating saw-frame consists of the two members B B', connected by the cross-bars $B^2$ $B^3$. The lower ends of the members B B' are provided with trunnion-bearings on the stationary sleeves C C', which in turn provide suitable journal-bearings for the main driving-shaft, as shown in the sectional parts of Fig. 3. The respective ends of the saw-arbor $C^2$ are journaled in the upper ends of the swinging members B B', the saw $C^3$ being mounted on the outer end of said arbor on the right side of the machine. Motion is transmitted to the saw by the belted connection $C^4$ between the pulley $C^5$ on the driving-shaft and the corresponding pulley $C^6$, mounted on the saw-arbor, Fig. 3, the dotted lines representing the belt. The longitudinal slot $C^7$ in the feed-table (see Fig. 2) is the pathway of the saw when in motion.

The two members comprising the automatically-swinging saw-frame have each two projecting lugs D and D' formed on the front side, (see Figs. 1 and 3,) which are perforated in their outer ends and form bearings for the companion rods $D^2$ $D^3$, having an endwise movement therein. The respective ends of the angular track-bars $D^4$ $D^5$ are secured to the main framework and present the irregular tracking-surface $a$ to the wheels $a'$ $a'$, Figs. 1 and 3, loosely mounted on the stub-axles $a^2$ $a^2$, rigidly secured on the rods $D^2$ $D^3$. This arrangement with the irregular track-surface regulates the travel or endwise movement of the rods $D^2$ $D^3$ with reference to the oscillation of the saw-frame. The upper ends of these companion rods terminate in the enlarged heads $a^3$ $a^3$, Fig. 3. These head ends are perforated to receive the transverse rod $D^6$, which is rigidly secured therein by means of the set-screws $a^4$. A number of fingers $D^7$ are loosely mounted on the rod $D^6$ and normally stand in the position illustrated in Figs. 3 and 5 and project up through the series of slots $D^8$ in the feed-table, as shown in Figs. 1 and 2. These fingers have a rocking movement on their bearing-rod and are provided on their lower ends with a counter-weight $a^5$, which automatically returns the fingers to the position shown in Fig. 1—that is, projecting above the feed-table. The collars $a^6$, which prevent a longitudinal movement of the series of fingers $D^7$, are cut away at one end and side, as shown in Fig. 4. When the fingers are in their normal position, the lower corresponding surface $a^7$ of the counter-weight $a^5$ will rest against the lower shoulder edge $a^8$ of the cut-away part of the collar, and when rocked on the rod $D^6$ in depressing the fingers below the surface of the feed-table the upper corresponding part $a^9$ of the counter-weight will stop against the upper shoulder edge $a^{10}$ of the collars, thus confining the movement of the series of fingers within proper working limits. The series of collars $a^6$ are adjustably secured on the rod $D^6$ by the set-screws $a^{11}$, which permits of the same being set in proper relative position with reference to the fingers. The purpose of these fingers is to remove the cut material and push it along until it finally drops off from the rear end of the feed-table.

The sawed stuff is shown in dotted lines in Figs. 1 and 2.

The transverse bar E is bolted to the feed-table at a point near the front end and is provided longitudinally on the upper side with the groove $b$, in which is inserted the corresponding part $b'$ of the gage-stop E'. This provides for the movement of the gage-stop along the track-surface of the bar E, and it is locked at any point by the hand-screw $b^2$. To the front side of the gage-stop is pivoted or hinged, as at $b^3$, the upper edge of the gage-plate $b^4$, as shown in Figs. 1 and 6. This gage-plate extends downwardly from its pivotal joint and rests loosely against the front side of the bar E and stops short of the surface of the feed-table. This gage-stop gages the length of the cut.

The bar E is provided with a number of recesses or pockets $b^5$, (see Fig. 6,) opening from the front side. These recesses are in the pathway of the different push-fingers, as shown in Fig. 2. When the fingers are on their backward or return movement and come in contact with the piece of lumber being cut off, they are depressed in a curved line by means of the arrangement described and pass underneath the same and the hinged gage-plate into the recesses in the bar E, where they have room to straighten up, and on the outward or forward movement clear the gage-plate by throwing the same upwardly on its hinged joint, and, coming in contact with the sawed stuff push it away and make room for the insertion of the board for the next cut. The push-fingers are rigid on their forward movement, but are so nicely balanced on their carrying-rod that the least obstruction in their pathway will depress them on the back movement. By this construction and arrangement the push-fingers have a movement coincident with that of the saw and automatically keep the table clear, so that the work is done with greater facility than is possible under the ordinary arrangement.

The operation of the machine being entirely automatic leaves both hands of the operator free to handle the lumber.

The mechanism for imparting the automatic swinging movement to the saw-frame and means for controlling the operation of the same will now be described.

The crank-shaft F is located at the rear end of the machine, one end being journaled in one of the corner-posts of the main frame and the other projecting end in the angular bracket F'. The crank-arm $F^2$ is mounted on the inner projecting end of the crank-shaft, as shown in Figs. 1 and 8, the corner-post of the main frame being broken away in Fig. 1 to show the relative arrangement. The rear end of the connecting-rod $F^3$ is secured to the crank-arm by the pin $d$. The opposite end of this connecting-rod is secured to one of the swinging-saw-frame members by the pins $d'$, Figs. 1 and 3. The gear-wheel $F^4$ is mounted on the crank-shaft and engages with the pinion $d^2$, mounted on the counter-shaft $F^5$, located below the crank-shaft and provided with suitable journal-bearings in the main frame and the bracket-post F'. The friction-pulley $F^6$ is also mounted on the counter-shaft $F^5$, Fig. 8, and is adapted to have frictional contact with the smaller companion pulley $d^3$, mounted on the counter-shaft G. The inner end of the counter-shaft G is journaled in the adjustable journal-box $d^4$, having a vertical movement in the inverted-U-shaped bracket $d^5$, rigidly bolted to the lower cross-bar of the main frame at the rear of the machine. The outer end of the shaft G is journaled in the corner-post of the main frame on that side and has the band-pulley G' mounted on the projecting end, as shown in Figs. 1 and 8. The belt $d^6$ connects the pulley G' with the smaller pulley $d^7$, Figs. 1 and 3, mounted on the driving-shaft $A^2$. By this arrangement the required motion is transmitted to the swinging saw-frame and parts connected thereto.

The vertical lever H is located at the front end of the machine and on the right side, as shown in Figs. 1 and 7. This lever is connected to the frame by the pivot-bolt $e$. The horizontal lever H' along the end of the frame, Fig. 7, at right angles to the lever H, is secured to the frame by the pivot-bolt $e'$. One end of this lever projects past the lower end of the lever H and is adapted to engage with the shoulder $f$, formed thereon. The counter-weight $f'$ on the lever H holds the lower end against the horizontal projecting end of the lever H', so as to automatically engage with the upper edge when the same is depressed. The opposite end of the lever H' is connected to the lower end of the vertical part of the angle-lever $H^2$. The horizontal part of the lever $H^2$ runs back and has its terminal end pivoted to the upper end of the link $g$, the lower end of which is in turn secured to the adjustable journal-box $d^4$, as shown in Figs. 8 and 9. $g'$ is the fulcrum-post for the lever $H^2$. The weight $h$ is mounted on the lever $H^2$ at the junction of the vertical and horizontal parts, as shown in Figs. 1 and 7. By this system of levers the swinging saw-frame and push-fingers can be instantly stopped or started and are under complete control of the operator. When necessary to stop the swinging saw-frame, the operator presses with his foot on the step $h'$, Figs. 1 and 8, fastened to the projecting end of the lever H', and forces the same down, when the lower shouldered end of the vertical starting-lever H automatically engages with it by reason of the counter-weight $f'$ and locks the same in its depressed position. This movement in turn raises up the vertical end of the lever $H^2$ and depresses the terminal horizontal end and throws the small friction-pulley down out of contact with the larger companion pulley and instantly stops the movement of the swinging saw-frame. This mechanism is started by moving the upper end of the vertical lever H toward the front of the machine, which throws the same out of engagement with the end of the horizontal lever H', the weight H automatically tilting the lever H² and bringing the friction-pulleys together.

Having thus described my invention, what I claim as new, and desire to secure by Letters Patent, is—

1. In a cut-off sawing-machine, the combination of the swinging saw-frame having projecting lugs formed thereon, the companion rods having an endwise movement in said lugs and parallel to the swinging frame, the track-bars having an irregular tracking-surface, the wheels secured to the companion rods and moving on the track-bars, the transverse rod connecting the upper ends of said companion rods, and the push-fingers loosely mounted on said transverse rod and projecting up through slots in the feed-table and adapted to have a movement coincident with that of the saw-frame, substantially as and for the purpose set forth.

2. In a cut-off sawing-machine, the combination, with a swinging saw-frame, of a number of push-fingers pivotally connected with relation thereto and having a movement coincident therewith, whereby the sawed-off material is pushed out of the way on the forward movement of the saw, substantially as described.

3. In a cut-off sawing-machine, the combination, with a swinging saw-frame, of a number of push-fingers connected to and moving therewith, the feed-table provided longitudinally with a number of slots in which said fingers move, and the transverse bar E, said fingers being rigid on their forward movement, but are depressed below the surface of the table on their return by coming in contact with said transverse bar, substantially as described.

4. In a cut-off sawing-machine, the combination, with a swinging saw-frame, of two companion endwise-moving rods located on opposite sides of said frame, a transverse carrying-rod connecting the upper ends of the companion rods, a number of push-fingers pivotally mounted on the carrying-rod and having a forward-and-back movement coincident with the saw-frame, the feed-table provided longitudinally with a number of slots up through which said fingers project, and the transverse bar bolted to the upper side of said table, said fingers being rigid on the forward movement, but depressed on their return movement by coming in contact with said bar or other object lying in their pathway, substantially as described.

5. In a cut-off sawing-machine, the combination of the swinging frame, the curved track-rails, the companion endwise-moving rods located at each side of said frame, the transverse carrying-rod connecting the upper ends of said companion rods, a number of push-fingers having counter-weights on their lower ends and loosely mounted on said carrying-rod, and a number of collars having one end and side cut away, whereby said fingers have a pivotal or rocking movement on their bearings, substantially as described.

6. The combination, with the transverse bar provided with a number of recesses or pockets, of the gage-stop having a gage-plate hinged or pivoted thereto and the push-fingers, substantially as described.

7. In a cut-off sawing-machine, the combination, with a swinging saw-frame, of a number of push-fingers pivotally connected thereto and having a coincident movement therewith, a feed-table provided with a number of slots up through which said fingers project, a transverse bar provided with a number of pockets or recesses, a gage-stop, and a gage-plate hinged or pivoted thereto, substantially as described.

ENGELBERT FISCHER.

Witnesses:
L. M. FREEMAN,
J. B. DONALSON.